United States Patent Office 3,521,597
Patented July 21, 1970

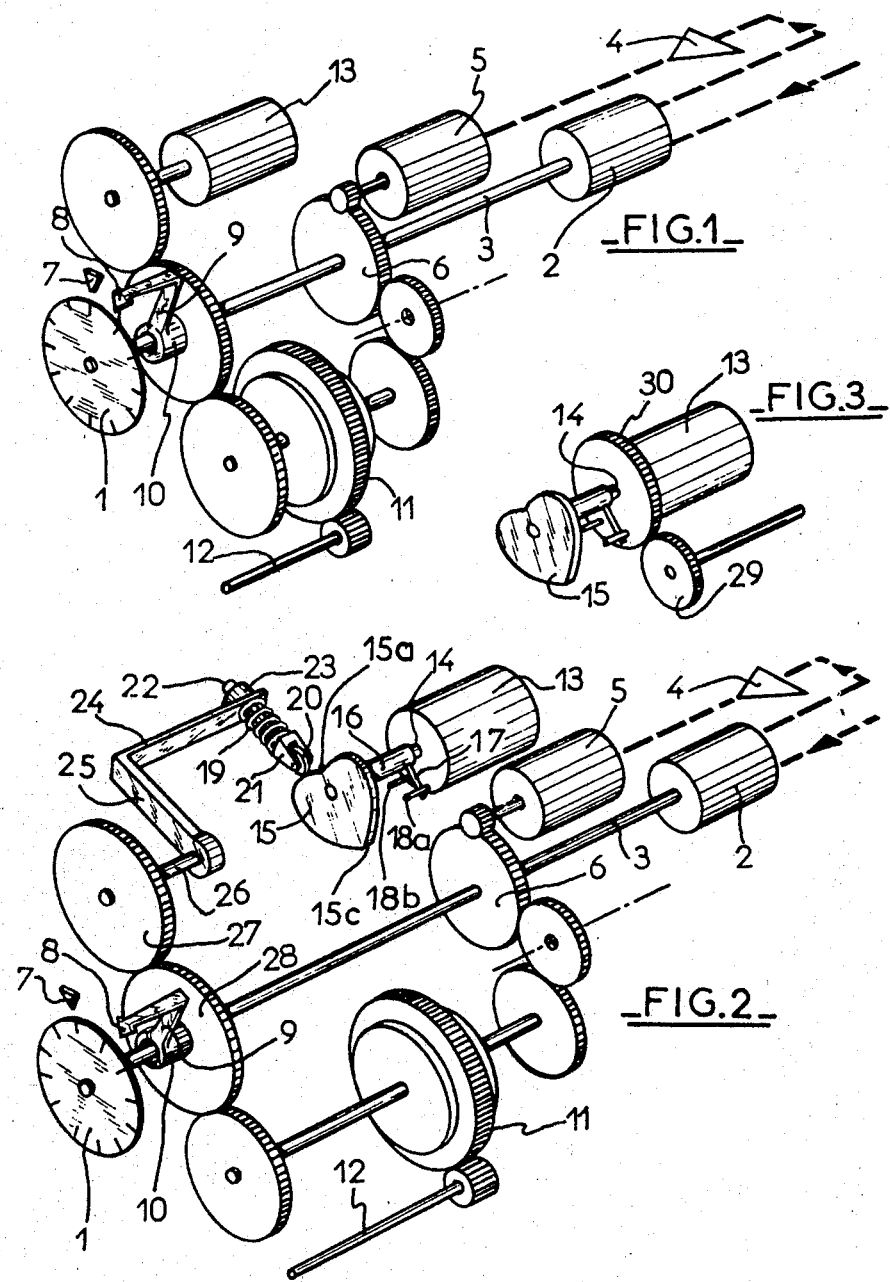

3,521,597
HEADING-SETTING CONTROLS
Pierre André Chombard, Boulogne, France, assignor to Societe Francaise d'Equipements Pour la Navigation Aerienne, Neuilly-sur-Seine, Hauts-de-Seine, France, a joint-stock company of France
Filed Apr. 8, 1969, Ser. No. 814,274
Int. Cl. G09f 9/00
U.S. Cl. 116—129                    6 Claims

ABSTRACT OF THE DISCLOSURE

Heading-setting apparatus with nonlinear coupling between the shaft of the pointer of heading to be kept and the rotor of a detector-transmitter. This coupling consists in the combination of a cam keyed on the shaft of the rotor comprising a hollow and a point, of a pressure roller mounted on the extremity of a rotatable arm, in constant contact with the cam and acting thereon, and travel limiting means for the cam-rotor assembly. With this arrangement the pilot has the possibility of registering changes of heading greater than ±180° by effecting the turn in the direction corresponding to that registered, that is to say by carrying out a turn of more than ±180°.

The present invention relates to an improvement in heading-setting controls.

The heading-setting controls known at the present time comprise a fixed reference mark opposite which moves an element which is controlled by a heading-setting station, for example a compass-card, so as to supply the heading being kept, a pointer coupled to a rotating shaft actuated by the pilot through the intermediary of a differential, the other input of which comes from the servo-control of the said element, in order to indicate the heading to be kept, a detector-transmitter, the rotor of which is coupled linearly to the shaft of the pointer, converting the difference between the heading being held and the heading to be held to an electric signal for effecting the necessary change of heading; controls of this type can only be suitable for use for changes of course heading less than 180°.

The present invention has for its object to give the pilot the possibility of registering changes in heading greater than ±180° by effecting the turn in the direction corresponding to that registered, that is to say by carrying out a turn of more than ±180°.

The invention has recourse to a nonlinear coupling between the shaft of the pointer of the heading to be held and the rotor of the detector-transmitter.

According to the invention, this nonlinear coupling is effected by the combination of a cam keyed on the shaft of the rotor of the detector, of a symmetrical geometric definition comprising a hollow and a point in opposition on the axis of symmetry, of a pressure roller mounted on the extremity of a rotatable arm capable of rotating through an angle equal to the angular displacement of the pointer and the fixed reference in constant contact with the cam and acting thereon, and travel-limiting means for the cam-rotor assembly so that this assembly can successively occupy, for one complete rotation of the said rotatable arm, a middle position corresponding to the coincidence of the pointer and the fixed reference and to a zero signal of the detector, a first limiting position persisting up to a rocking of the cam-rotor assembly and then a second limiting position persisting up to the return to the middle position.

Other characteristic features and advantages of the present invention will be brought out in the description which follows below, reference being made to the accompanying drawings, in which:

FIG. 1 represents diagrammatically and in perspective a heading-setting control of known type;

FIG. 2 shows a perspective view of an improved heading-setting control according to the invention;

FIG. 3 is a perspective view also of a detail of an alternative form of the control according to the invention;

Figure 4:
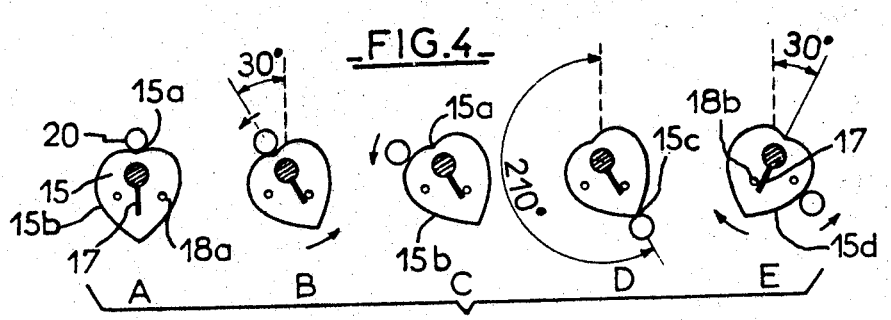
FIG. 4 shows in plan view and in different positions of operation, a cam of the device according to the invention.

In FIG. 1, a compass-card 1 is controlled by a heading signal transmitter (not shown) by means of a synchro-detector 2, the said compass card and the rotor of the said synchro-detector being keyed on a common shaft 3. The signal from the synchro-detector 2 is amplified by the amplifier 4 so as to supply the motor 5 which drives simultaneously, through the intermediary of the shaft 3 and the toothed wheel 6 keyed on this shaft, the compass card 1 and the rotor of the synchro-detector 2 in order to close the loop of the servo-control. The heading kept is read opposite a fixed reference 7. The pilot can register the heading to be set on the card 1 by means of a moving pointer 8. This pointer 8 is itself fixed to the extremity of a cranked lever 9 rigidly coupled to the hollow shaft 10 which is coaxial with the shaft 3. The pilot can displace the pointer 8 by acting on a mechanical differential 11, through the intermediary of a control knob 12, the other input of the differential being taken from the servo-control device of the compass-card 1.

An electric signal representing the difference between the pointer 8 and the reference 7, utilized for the control of an automatic pilot or a flight director is supplied by a detector transmitter 13, synchro or potentiometer, the rotation of the rotor of which is coupled to that of the hollow shaft 10 carrying the pointer 8. The signal obtained starts from a zero value when the difference between the heading to be kept and the heading kept is zero and increases with this difference, changing sign in the case of a continuous signal or by 180° in phase in the case of an alternating-current signal, depending on whether the said difference occurs in one direction or in the other. The result is that the changes in heading which can be controlled have an upper limit of 180°; this limit cannot however be attained in practice, due to the fact that the potentiometers have necessarily a discontinuity, and that the synchros give a signal which becomes zero at ±180°.

In FIG. 2, the angular displacement between the fixed reference 7, which indicates the heading kept, and the pointer 8 which indicates the heading to be followed is no longer directly transmitted in its true magnitude to the moving element of the detector-transmitter 13, but by a device which forms the object of the invention.

(In order to facilitate understanding of the invention, the numerical references of the elements of the parts of the known device of FIG. 1 which remain in the improved device have been retained.)

On the rotating shaft 14 of the detector 13 is keyed a heart-shaped cam 15 associated by a sleeve 16 to a finger 17 which moves between two abutments 18a and 18b rigidly fixed on the stator of the detector or on the frame on which the latter is fixed. The middle position of the finger 17 between the abutments 18a and 18b correspond to the zero signal of the detector.

Against the edge of this heart-shaped cam there is applied, by a spring 19, a roller 20, the pivot of which is received in a fork 21 mounted on a rod 22 capable of sliding in a sleeve 23 which is in turn fixed to one of the levers 24 of a crank 25. The spring 19 is interposed between the fork 21 and the sleeve 23. The other lever 26 of the crank forms a shaft on which is keyed a toothed wheel 27. The shaft 26 is disposed in the extension of the shaft 14 of the detector 19.

The shaft 26 receives its movement from the toothed wheel 28 which is keyed on the hollow shaft 10 and is equal to the wheel 27.

In consequence, the shaft 26 turns through an angle equal to the angular displacement of the fixed reference 7 and the pointer 8. The assembly is keyed in order that, when the fixed reference 7 and the pointer 8 coincide, the roller 20 is in the hollow or notch 15a of the cam 15 while the finger 17 is in the centre of the space between the abutments 18a and 18b, so that the signal from the detector is zero (see FIG. 4, position A).

The control shaft 12, turned by hand or by a motor, permits the registration by the pointer 8 of a heading to be followed on the compass card 1. In doing this, the shaft 14 of the detector 13 rotates through the same angle until the finger 17 touches an abutment (in the direction chosen the abutment 18a; FIG. 4; position B), the detector delivers a signal following its own law which is, for example, sinusoidal in the case of a synchro (see FIGS. 5 and 6).

Figure 5:
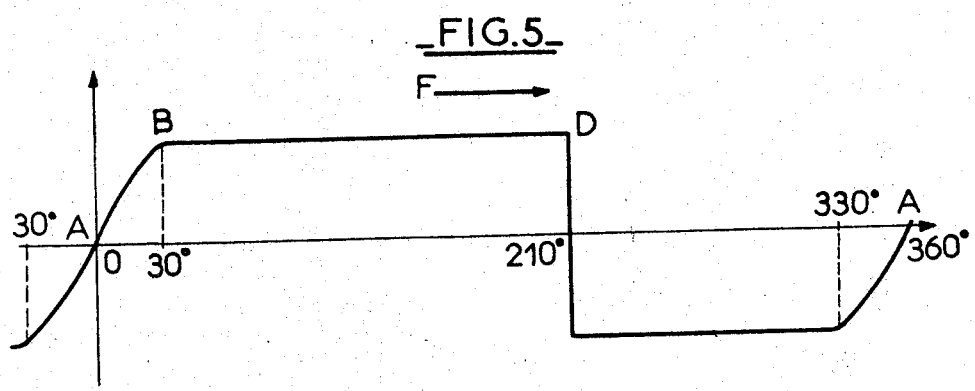
FIGS. 5 and 6 represent respectively the signal supplied by the detector-transmitter when the pressure roller rotates in one direction or in the other.
Figure 6:
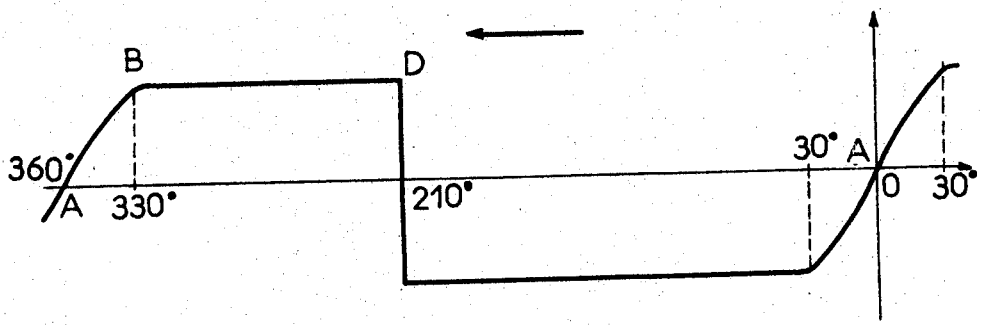

In FIGS. 4, 5 and 6, this travel of the detector rotor is limited to 30° starting from zero, by way of example. If it is desired to register a greater change of heading the roller 20 leaves the hollow of the cam 15, while maintaining the finger 17 in contact with the abutment 18a by virtue of its action on the profile 15b of the cam (see FIG. 4, position C). The signal delivered by the detector remains constant. When the roller 20 passes beyond the point 15c of the cam 15, 180° after the contact of the abutment 18a (see FIG. 4, position D), the cam rocks through 60° (the finger 17 coming into contact with the other abutment 18b) due to the reversal of the action of the roller 20 on the cam 15 (see FIG. 4, position E). The roller then acts on the profile 15b of the cam. FIGS. 5 and 6 show the form of the signal emitted by the detector 13.

The curve shown in FIG. 5 gives the form of the signal from the detector 13 over one revolution of 360° of the shaft 26, in the direction of the arrow F. In the example given, it is possible to control a change of heading of 210° (30° from the position A to the position B and 180° from B to D) while maintaining the signal from the detector 13 at its constant maximum value from 30°.

At D the signal is reversed immediately and takes the maximum value symmetrical with that which it had between the position B and D. This value is maintained as long as the roller 20 is located on the other profile 15d on the cam which has rocked, and until it reaches the hollow 15a of the cam (330°). The signal then returns to its null value (360°) when the cam-rotor assembly returns to the position A.

The curve of FIG. 6 shows the shape of the signal over one revolution of 360° of the shaft 26 in the direction opposite to that of the arrow F. This curve is symmetrical with that of FIG. 5 with respect to the origin point 0 of the coordinates.

In the alternative form of FIG. 3, there is contemplated the application of the device according to the invention to a route control by introducing the drift by means of a pinion 29 driving an external toothed wheel 30 of the detector.

I claim:
1. An improved heading-setting device comprising indicating means controlled by a heading signal transmitter to indicate the heading being held,
   a fixed reference device mounted adjacent and in operative relationship with said indicating means,
   a differential system having first and second input shafts and manual actuating means connected thereto,
   a pointer mounted adjacent said indicating means and having a rotatable shaft upon which said pointer is mounted for movement,
   said pointer operatively connected through said rotatable shaft to said first input shaft,
   a servo control coupled to said second input shaft and to said indicating means so that said pointer will indicate on said indicating means the heading to be kept,
   a detector-transmitter having a rotor and shaft for said rotor and adapted to convert the difference between the heading being held and the heading being kept to an electric signal intended to effect the change of heading,
   non-linear coupling means connecting said rotor of said detector-transmitter to said rotatable shaft of said pointer so that the rotation of said rotor remains less than ±180 degrees when the difference between the heading to be kept and the heading actually held exceeds 180 degrees by a certain value, said non-linear coupling means comprising:
   a rotatable arm adapted to rotate of an angle equal to the angular distance between said pointer and said fixed reference device,
   a cam keyed on said shaft of said rotor and constituting with said rotor a cam-rotor assembly, said cam having a symmetrical shape with a notch and a point laying opposite to each other on the axis of symmetry of same,
   a roller in constant contact with said cam and acting on it,
   motion limiting means for said cam-rotor assembly so that said assembly can successively take, for a complete rotation of said arm, a middle position, a first limiting position persisting until a rocking of said assembly occurs, and a second limiting position.

2. An improved heading-setting device as claimed in claim 1 in which said cam is a heart-shaped cam and the position of said roller within said slot of said cam corresponding to said middle position of said cam-rotor assembly and the passing of said roller to said point of the cam causing the rocking of same.

3. An improved heading-setting device as claimed in claim 1 in which said rotatable arm is a crank comprising a web and two levers, one of said levers constituting a shaft laying on the same axis as the shaft of said detector-transmitter and operatively connected through said rotatable shaft upon which said pointer is mounted.

4. An improved heading-setting device as claimed in claim 3 comprising
   a sleeve mounted on the other lever of said crank,
   a rod adapted to reciprocate within said sleeve,
   a fork mounted on said rod,
   a resilient means placed between said fork and said sleeve,
   said roller being adapted to rotate within said fork.

5. An improved heading-setting device as claimed in claim 3 comprising a sleeve mounted on the other lever of said crank,
a rod adapted to reciprocate within said sleeve, a fork mounted on said rod,
a resilient means placed between said fork and said sleeve,
said roller being adapted to rotate within said fork.

6. An improved heading-setting device as claimed in claim 1 in which said motion limiting means comprise two fixed abutments,
a finger mounted on said cam-rotor assembly and adapted to move between said two abutments.

References Cited

UNITED STATES PATENTS

| | | | |
|---|---|---|---|
| 2,934,743 | 4/1960 | Dayton et al. | 340—27 |
| 2,943,482 | 7/1960 | Fritze et al. | 73—178 |
| 3,220,252 | 11/1965 | Wright | 73—178 |
| 3,394,676 | 7/1968 | Bonnefont | 116—129 |

LOUIS J. CAPOZI, Primary Examiner

U.S. Cl. X.R.

73—178; 33—204